(12) United States Patent
Monobe et al.

(10) Patent No.: US 7,035,463 B1
(45) Date of Patent: Apr. 25, 2006

(54) DOCUMENT IMAGE PROCESSOR, METHOD FOR EXTRACTING DOCUMENT TITLE, AND METHOD FOR IMPARTING DOCUMENT TAG INFORMATION

(75) Inventors: Yusuke Monobe, Osaka (JP); Atsushi Hirose, Sanda (JP); Akito Umebayashi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/914,573

(22) PCT Filed: Feb. 29, 2000

(86) PCT No.: PCT/JP00/01177

§ 371 (c)(1),
(2), (4) Date: Aug. 31, 2001

(87) PCT Pub. No.: WO00/52645

PCT Pub. Date: Sep. 8, 2000

(30) Foreign Application Priority Data

Mar. 1, 1999 (JP) .................................. 11-052156
May 14, 1999 (JP) .................................. 11-133849

(51) Int. Cl.
*G06K 9/34* (2006.01)

(52) U.S. Cl. ....................................... 382/177; 382/292
(58) Field of Classification Search ................ 382/112, 382/173, 175–177, 180, 282, 292; 358/453, 358/462, 538
See application file for complete search history.

(56) References Cited

U.S. PATENT DOCUMENTS

| 5,751,921 | A | * | 5/1998 | Fujimoto ..................... 358/1.9 |
| 5,821,929 | A | * | 10/1998 | Shimizu et al. ............. 382/190 |
| 5,825,936 | A | * | 10/1998 | Clarke et al. ............... 382/264 |
| 5,892,843 | A | * | 4/1999 | Zhou et al. ................. 382/176 |
| 6,035,061 | A | * | 3/2000 | Katsuyama et al. ........ 382/177 |

FOREIGN PATENT DOCUMENTS

| JP | 63-115456 A | 5/1988 |
| JP | 05-054191 | 3/1993 |
| JP | 05-135120 | 6/1993 |

(Continued)

OTHER PUBLICATIONS

Yanai et al.; "Multivariate Analysis Handbook"; 1st Edition; Gendai Suugaku Sha, c. 1996; p. 257.

*Primary Examiner*—Vikkram Bali
*Assistant Examiner*—Colin LaRose
(74) *Attorney, Agent, or Firm*—McDermott Will & Emery LLP

(57) ABSTRACT

A document image processing device and method for extracting a title region and a mark attached by the user from a document image to use them as document tag information. A region with a region average character size larger then a predetermine extraction judging value is extracted as a title region by title region extracting means. As a result, title regions can be extracted from one document image. A mark that the user makes on an input image is extracted by mark extracting means, and characteristic value of the mark is found by calculating means. Document tag information to be imparted to the input image is selected from reference tag information according to the characteristic value and the attribute value of the reference tag information imparting means. Thus, document tag information is automatically imparted to a document image.

21 Claims, 17 Drawing Sheets (I)

(II)

FOREIGN PATENT DOCUMENTS

| | | |
|---|---|---|
| JP | 05-274367 | 10/1993 |
| JP | 07-044712 | 2/1995 |
| JP | 07-200634 | 8/1995 |
| JP | 07-306872 | 11/1995 |
| JP | 08-139920 | 5/1996 |
| JP | 08-147313 | 6/1996 |
| JP | 08-166959 | 6/1996 |
| JP | 09-120443 | 6/1997 |
| JP | 10-232926 | 9/1998 |
| JP | 10-289247 | 10/1998 |

* cited by examiner

Fig. 7
|  |  |  |
|---|---|---|
| W1 (WHITE) | W2 (BLACK) | W3 (BLACK) |
| W4 (WHITE) | W5 (BLACK) | W6 (WHITE) |
| W7 (WHITE) | W8 (BLACK) | W9 (WHITE) |
Fig. 8
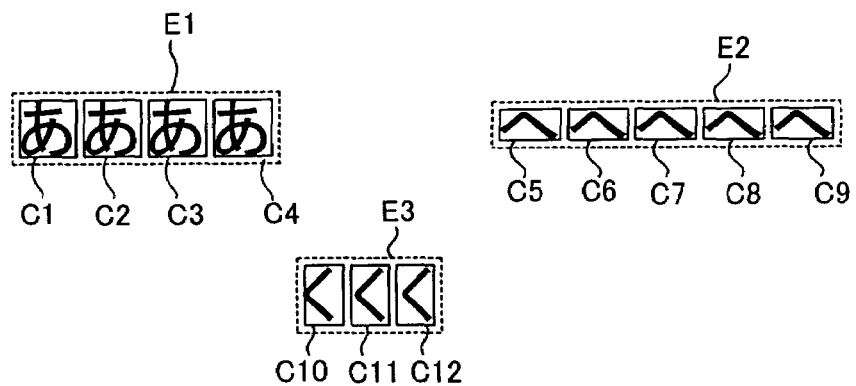
Fig. 9
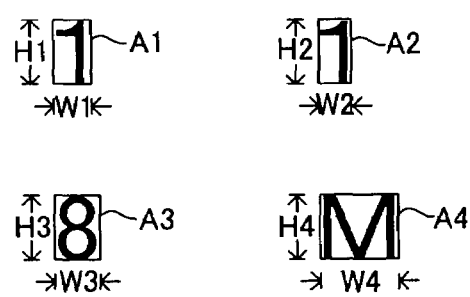

| | DESIGNATION OF RANGE OF LEVEL ATTRIBUTE TO BE DISPLAYED IN A LIST | |
|---|---|---|
| | LEVLE [1]~[3] | |
| TITLE-REGION IMAGE | TITLE-CHARACTER STRING | LEVLE ATTRIBUTE/NUMBER OF TOTAL LEVLES |
| Title AAA | Title AAA | 1/5 |
| Title BBB | Title BBB | 3/5 |
| ⋮ | ⋮ | ⋮ |

(a) REGISTRATION IMAGE MANAGEMENT TABLE 1212

| IMAGE ID | POINTER TO IMAGE DATA | DOCUMENT TAG INFORMATION APPOINTING PAGE FLAG | NUMBER OF MARKS | MARK MANAGEMENT GROUP NO. |
|---|---|---|---|---|
| 000001 | →A | 1 | 3 | 000001 |
| 000002 | →B | 0 | — | 000001 |
| 000003 | →C | 0 | — | 000001 |
| 000004 | →D | 1 | 2 | 000002 |
| 000005 | →E | 0 | — | 000002 |

(b) IMAGE STORAGE AREA

Fig. 14

MARK MANAGEMENT TABLE 1213

| MARK ID | MARK MANAGEMENT GROUP NO. | DOCUMENT TAG INFORMATION | POSITION(x,y) | SIZE(w,h) |
|---|---|---|---|---|
| 000001 | 000001 | CONFIDENTIAL | (100,200) | (500,200) |
| 000002 | 000001 | A COMPANY | (120,400) | (430,180) |
| 000003 | 000001 | YEAR '99 | (105,630) | (550,220) |
| 000004 | 000002 | CONFIDENTIAL | (95,850) | (530,210) |
| 000005 | 000002 | B COMPANY | (90,1070) | (490,200) |
| | | | | |

(a) REFERENCE TAG INFORMATION MANAGEMENT TABLE 1214

| REFERENCE TAG INFORMATION | POINTER TO MARK IMAGE FOR LEARNING | CHARACTERISTICS VALUE | | | | | |
|---|---|---|---|---|---|---|---|
| | | M1 | M2 | M3 | M4 | M5 | M6 |
| CONFIDENTIAL | →P | 1.865 | 0.850 | 0.392 | 0.192 | 0.296 | 0.218 |
| A COMPANY | →Q | 1.359 | 0.654 | 0.477 | 0.240 | 0.408 | 0.205 |
| B COMPANY | →R | 1.053 | 0.564 | 0.444 | 0.185 | 0.311 | 0.215 |
| YEAR '99 | →S | 1.724 | 0.205 | 0.386 | 0.275 | 0.281 | 0.363 |
| CONFIDENTIAL | →T | 1.569 | 0.433 | 0.567 | 0.086 | 0.459 | 0.096 |
| YEAR 2000 | →U | 1.932 | 0.762 | 0.683 | 0.165 | 0.233 | 0.321 |
| NEW CAR | →V | 1.511 | 0.323 | 0.528 | 0.096 | 0.487 | 0.102 |
| | | | | | | | |

(b) REFERENCE TAG INFORMATION STORAGE MEANS 1215

Fig. 18

MARK STAMP MANAGEMENT TABLE 1213'

| STAMP ID | IMAGE ID | DOCUMENT TAG INFORMATION | POSITION(x,y) | SIZE(w,h) |
|---|---|---|---|---|
| 000001 | 000001 | CONFIDENTIAL | (100,200) | (500,200) |
| 000002 | 000001 | A COMPANY | (720,210) | (430,180) |
| 000003 | 000001 | YEAR '99 | (1050,2630) | (550,220) |
| 000004 | 000002 | CONFIDENTIAL | (110,190) | (500,200) |
| 000005 | 000002 | A COMPANY | (700,200) | (430,180) |
| 000006 | 000002 | YEAR '99 | (1000,2380) | (550,220) |
| 000007 | 000003 | CONFIDENTIAL | (95,195) | (500,200) |
| 000008 | 000003 | B COMPANY | (90,220) | (420,190) |
|  |  |  |  |  |

131' 132' 133' 134' 135'

DOCUMENT IMAGE PROCESSOR, METHOD FOR EXTRACTING DOCUMENT TITLE, AND METHOD FOR IMPARTING DOCUMENT TAG INFORMATION

TECHNICAL FIELD

This invention relates to a document image processor and a document image processing method for storing and managing document images as image data, more specifically relates to apparatus and a method for extracting title regions and marks attached by a user from a document image to use them as document tag information.

BACKGROUND OF ART

Together with an improvement of capability of data storage, document image processors rapidly become popular in which a paper document read from a scanner and etc. is stored and managed as a document image that is image data of the document.

It is arranged in such document image processor that each document image is registered corresponding to character strings that are document tag information like a keyword or a title, in order to search a desired document image from plural document images stored in a data storage.

FIG. 19 shows the document tag information conceptually. As shown in the drawing, the document tag information, such as "Confidential" 191, "A-company" 192, "Year 1999" 193 and "New car" 194, for example, acts as a keyword for a document image 190. Provided that a plurality of document tag information is attached to each document image in this way, it is possible to search a desired document image by limiting those plural document tag information.

In a conventional way, a user has inputted by hand those document tag information at storing of the document image. When the user input the document tag information, however, if the number of documents increases, the workload becomes large. Accordingly, such inputting operation is quite impractical. So in recent years the other apparatus has appeared that is able to recognize characters on the document image, handle a recognized character string as document tag information, and then attach the document tag information to the document image without assistance of hand labor.

For instance, Japanese laid-open publication No. 8-147313 discloses a method of using a mark sheet. In the method, first, a user checks off a check box of document tag information to be attached to a document image, the document tag information described on the mark sheet in a specific form. The mark sheet is read by a document image processor before the paper document is read, whereby the document tag information to be attached can be specified from the nominees of document tag information registered in advance. The method does not require a use of an input device such as a keyboard or a pointing device, and it is possible to attach the document tag information automatically to the document image to be registered.

Incidentally, it is very important for an effective searching of document images to give appropriate document tag information to the document images. Specifically, a general searching method is to specify document tag information corresponding to a desired document image from a list of plural document tag information displayed on a screen. And in order to specify such document tag information quickly, respective document tag information should express the contents of the document directly.

The Japanese Laid-open Publication No. 8-202859 discloses another method wherein a region including a title-character string (which is called a "title region" hereafter) is extracted from a document image, and the characters in the image of the title region is recognized, and then a recognized title-character string is made to document tag information. Since the title-character string represents the contents of the document directly, an image data processor adopting the title-region extracting method can quickly specify the document tag information corresponding to the desired document image.

The above method of extracting the title region, which is disclosed in Japanese laid-open publication No. 8-202859, is based on the aspect that the title characters are in the largest size among all of characters included in the document image. After dividing the document image into plural regions (a region to which consecutive character rectangles are combined), and calculating an average of character size in the respective regions, a region in which the average of character size is the maximum is extracted as a title region. Accordingly, it is natural that the title-region extracting method extracts only one title region for a document image.

However, if there are plural documents with the similar contents, the documents always have the similar titles each other. Therefore, the conventional title-region extracting method had a problem that, when there are plural documents with similar contents, it is impossible to quickly specify the document tag information corresponding to the desired document image.

In order to avoid the above problem there is a method without attaching similar titles to documents at preparing paper documents. However, it is undesirable to request a user to do the preparatory operation.

On the other hand, the method in Japanese laid-open publication No. 8-147313, which uses a mark sheet, has a very troublesome work that it is necessary to define the form of the mark sheet describing all items of the document tag information, and to define the reading method of the mark sheet, when a document image processor is configured as the software. In addition, in case of adding and registering nominees of new document tag information later on, the items of document tag information are changed. Thereby, it is necessary to reconstruct the form of the mark sheet and the reading method.

In addition, in case of using the mark sheet, since the user always uses the same sheet to check off the check box, it is hard for a user to visually confirm which document tag information is attached to the document image, and it causes inputting mistakes frequently.

The invention is proposed taking the above problems into consideration, and has an object to provide the document image processor for extracting title regions and marks attached to a document image by the user from a document image to use them as document tag information, and to provide the method for extracting document titles, and the method for imparting document tag information.

DISCLOSURE OF THE INVENTION

The invention adopts the following means in order to achieve the objects.

A document image processor, as shown in FIG. 1, comprising region dividing means 103 for dividing a document image into a plurality of regions, and title-region extracting means 104 for calculating a first average that is an average of character size in each region divided by the region dividing means 103, and extracting title regions from all the regions according to the first averages, the document image processor adopts the following means.

After calculating a second average equivalent to an average height of characters included in all the regions, the title-region extracting means 104 compares the first average and an extracting criterion that is the second average multiplied by an extracting parameter, and then extracts, as a title region, regions with the first average larger than the extracting criterion. Accordingly, if the region has the first average larger than the extracting criterion, the region is extracted as a title region. Therefore, it is possible to extract a plurality of title regions from a document image.

In addition, the title-region extracting means 104 may calculate extracting criteria on a plurality of levels by using extract parameters on a plurality of levels. Thereby, the extracting judgment can be performed based on respective extracting criteria on a plurality of levels, so that it is possible to extract not only title regions but also subtitle regions (a region including a subtitle-character string composed of characters in a little smaller size than the title character).

Furthermore, the title-region extracting means 104 may determine the extracting parameters on a plurality of levels based on a value found by dividing the maximum value of the first average by the second average. If the extracting parameter is calculated based on the maximum value of the first average without being limited to a fixed value, it is possible to obtain the extracting criteria more accurately.

And since the trimmed mean method for excluding characters larger than a specific proportion of the maximum character size and characters smaller than the specific proportion of the minimum character size is used to calculate the second average and the first average, it is possible to improve the accuracy of the extracting further more.

Moreover, the image of characters included in the extracted title region can be converted to a title-character string of a character code string by character recognizing means 105. Correcting means 112 corrects the title-character string; thereby a user can change the title of the document image freely.

Secondary, in the document image processing for preparing and storing document images by reading a paper document, reference tag information storage means 1215 is provided as shown in FIG. 12 for storing reference tag information (a nominee of document tag information) together with an attribute value of the reference tag information in advance.

Next, mark extracting means 1205 is provided for extracting a specific mark attached to a paper document by a user. The mark indicates a general mark imparted in order for a user to identify the paper document, such as a stamp, a seal, an illustration, a signature of specific handwriting, and etc.

Calculating means 120A is provided in order to calculate a characteristics value representing the characteristics of the mark according to the variance of pixels composing the extracted mark.

Document tag information imparting means 1208 is provided for comparing the attribute value and the characteristics value, selecting the reference tag information with the highest degree of similarity, and then imparting the selected reference tag information to the document image.

According to the above steps, it is possible to automatically impart the document tag information to the document image based on the mark that the user uses at the routine work of document filing Therefore, the invention makes it easy to operate the document management at the office.

BRIEF DESCRIPTION OF THE DRAWINGS

FIG. 7 shows an explanatory diagram of the labeling process.

FIG. 8 shows an explanatory diagram of the region dividing process.

FIG. 9 shows a diagram indicating the correlation among the height, the width, and the area of the character rectangle.

FIG. 11 shows a diagram representing the contents displayed on a screen at the searching in the second embodiment.

FIG. 14 shows an explanatory diagram of the mark management table in the fifth embodiment of the invention.

FIG. 18 shows an explanatory diagram of the mark management table in the sixth embodiment of the invention.

BEST MODE FOR CARRYING OUT THE INVENTION

Embodiment 1

Figure 1:
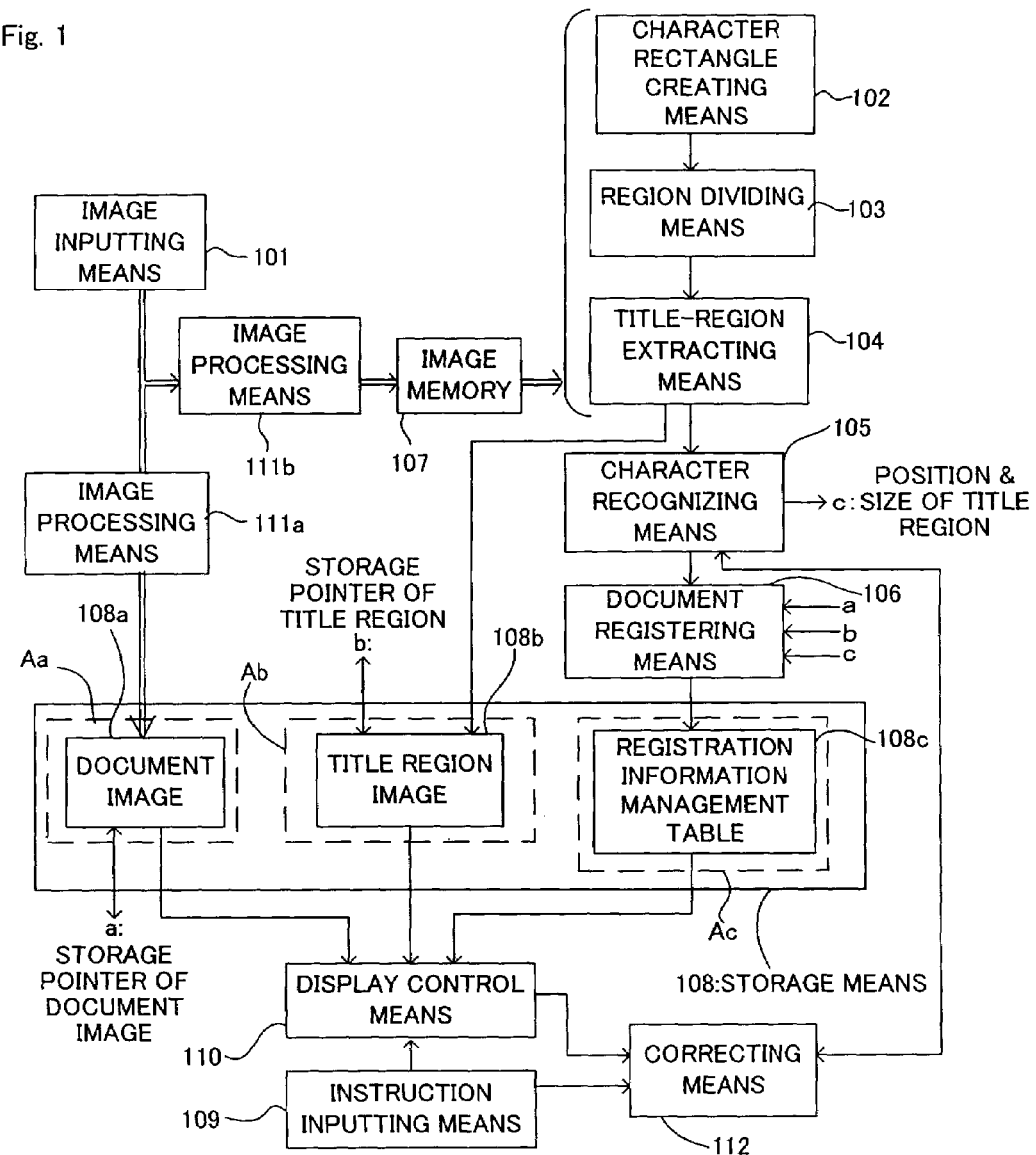
FIG. 1 shows a schematic functional block diagram of a document image processor in the first embodiment of this invention.

The embodiments of the invention are explained hereafter referring to the drawings. The embodiments 1, 2, 3 and 4 are explaining about a document image data processor for extracting plural titles from a paper document.

FIG. 1 shows a schematic functional block diagram of a document image processor to which the present invention is applied. The configuration of the processor will be explained together with the process of the document image registration.

First, an image inputting means 101 like a scanner, for example, performs the photoelectric conversion of a paper document, and then a document image 108a that is multi-valued image data is obtained. After an image processing means 111a performs an appropriate processing for the storing (the compressing, for example), the document image is registered in a document image area Aa of a storage means 108. Needless to say, it may be configured that the document image processor is not provided with the image processing means 111a, but registers the multi-valued image data in the document image area Aa without change.

The document image inputted to the image processing means 111a from the image inputting means 101 is also inputted to an image processing means 111b. Here, the document image is converted to binary image data, and then stored into an image memory 107. Referring to the document image stored in the image memory 107, a character rectangle creating means 102 performs the following labeling process. The labeling is a processing for imparting the same label value (identification information) as a notable black pixel (which is called a "target pixel" hereafter) to other black pixels of pixels contiguous to 8 directions of the target pixel, that is, the top side, the upper right side, the right side, the lower right side, the down side, the lower left side, the left side, and the upper left side, of the target pixel. That is to say, as shown in FIG. 7, where 8 pixels, W1, W2, W3, W4, W6, W7, W8 and W9 are contiguous to the target pixel W5, the character rectangle creating means 102 gives the label value same as that of the target pixel W5 to the black pixels W2, W3 and W8. According to such labeling, the same label value can be given per black-pixel-connected component in the document image (per continuous black pixels).

Next, the character rectangle creating means 102 prepares a character rectangle by cutting off the black-pixel-connected component attached with the same label value, and then transfers the character rectangle to region dividing means 103. Here, the "character rectangle" means a circumscribed rectangle of a black-pixel-connected component. However, there is a case where a character is not always configured by one black-pixel-connected component. In consideration of this, it can be arranged that a section of the black pixel in the document image is expanded before the labeling. Specifically, the processing is for converting the 8 pixels contiguous to the target pixel to black pixels. The processing is repeated by appropriate times (generally twice or triple), thereby the section of black pixel is enlarged, and accordingly it is possible to combine respective black-pixel-connected components, which form a character and are apart from each other within the character, into one unit. If the labeling is performed after the above-mentioned processing, it is possible to prepare the character rectangle per character precisely.

When the character rectangle creating means 102 completes the processing, the region dividing means 103 detects areas adjacent to respective character rectangles, and then divides the document image to regions by combining the character rectangles contiguous with each other. For instance, the region dividing means 103, upon receipt of the character rectangles C1 to C12 as shown in FIG. 8, combines the character rectangles C1 to C4, C5 to C9, and C10 to C12 respectively, and then divides the document image into regions E1, E2 and E3. According to thus region dividing, the document image can be divided into regions per character string. In order to judge whether the character rectangles are contiguous with each other or not, or whether there is an interlinear blank between the character rectangles or not, proper threshold values of a character gap and an interlinear space may be used to the judgment.

As a result of the above processing, it is possible to obtain the information of the size of all the characters in the document image (which will be described later), the number of the divided regions, and the number of the character rectangles in each region. It is arranged in the invention that the serial number starting from 1 be given to each divided region and also be given to each character rectangle included in the region respectively. Hereinafter, the number of character rectangles in the n-th region is represented by NumChar$_n$, and the size of the m-th character in the n-th region is represented by SizeChar$_{n,m}$.

Incidentally, as shown in FIG. 9, if the characters are the same font and the same typography point, widths W1 to W4 and areas A1 to A4 for the character rectangle depend on the character itself and fluctuate sharply, conversely heights H1 to H4 of the character rectangle fluctuates a little. Therefore, the invention may adopt as the character size "the height of character rectangle", on which the point of a character font is reflected comparatively correctly.

Here, a title-region extracting means 104 extracts only specific regions as a title region from all regions divided as above. The title-region extracting is explained hereinafter according to a flowchart shown in FIG. 2.

Figure 2:
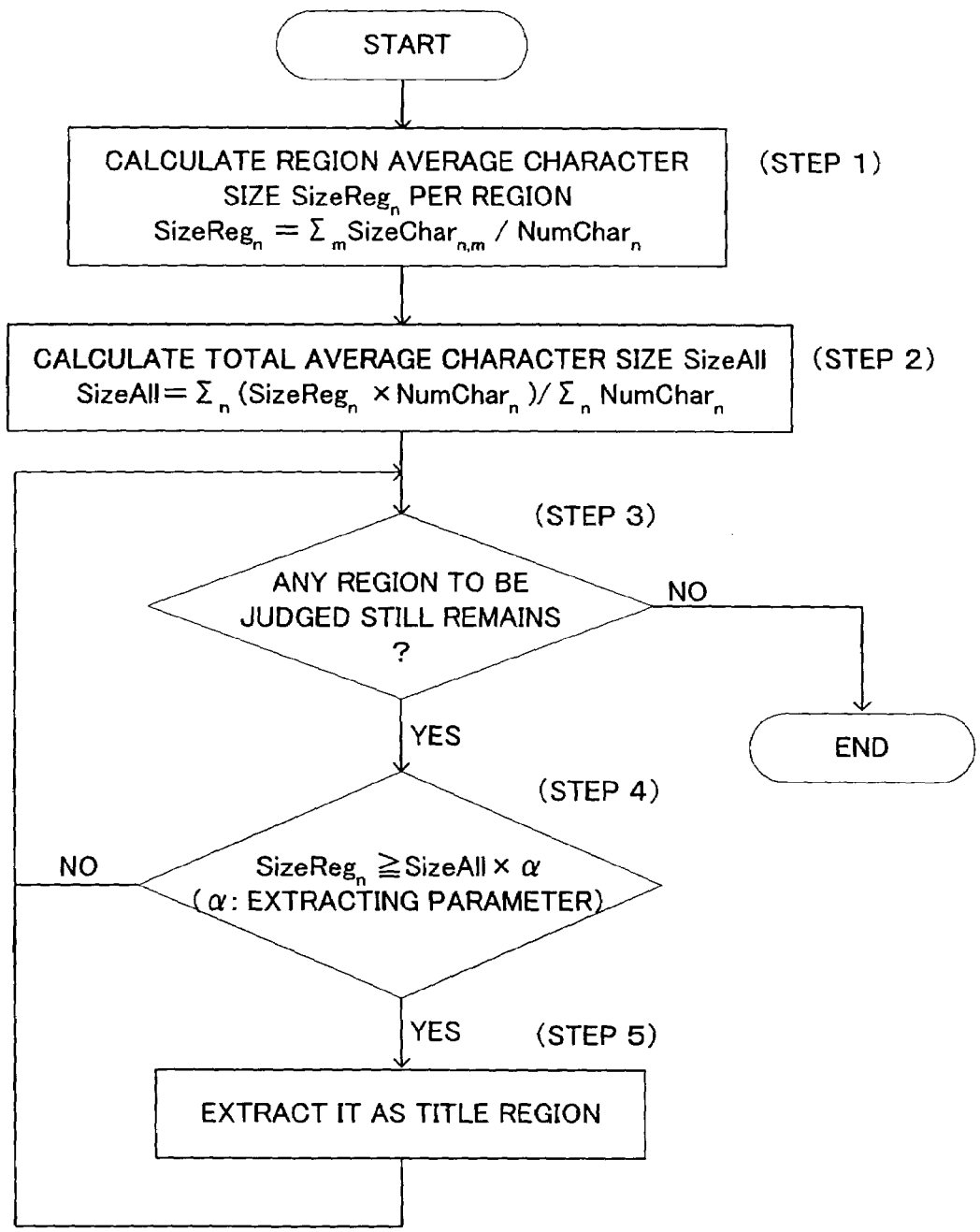
FIG. 2 shows a flowchart of the title-region extracting process in the first embodiment of the invention.

Fist, the title-region extracting means 104 calculates a first average per region (FIG. 2, Step 1). The first average is an average of size of characters included in a region. The first average in the n-th region, SizeReg$_n$, is found by dividing the sum (SizeChar$_{n,m}$) of all the sizes of the characters included in the region by the number (NumChar$_n$) of characters in the region. This correlation is represented by the following equation.

$$SizeReg_n = \Sigma SizeChar_{n,m}/NumChar_n \qquad \text{[Equation 1]}$$

Next, according to the first average SizeReg$_n$ and the number of characters in the region NumChar$_n$, a second average, SizeALL, which is an average of character size in the document image, is calculated by the following equation (FIG. 2, Step 2).

$$SizeALL = \Sigma(SizeReg_n \times NumChar_n)/\Sigma numChar_n \qquad \text{[Equation 2]}$$

The method of calculating the first average SizeReg$_n$ and the second average SizeAll is not restricted to the above method. For example, it is possible to adopt the trimmed mean method (a method of calculating the average after discarding a specific proportion, for example, 10% of data, from the minimum value and the maximum value), which will be explained later.

Here, according to the judgment whether or not the following equation for the extracting judgment is established, the title-region extracting means 104 performs the extracting judgment of the title region.

$$SizeReg_n \geq SizeALL \times \alpha \qquad \text{[Equation 3]}$$

That is to say, after comparing a value found by multiplying the calculated second average SizeALL by an extracting parameter α (an extracting criterion) and the first average SizeReg$_m$, only the region where the equation of the extracting judgment is established is extracted as a title region (FIG. 2, Step 3 to 4 to 5). The extracting parameter α should be a constant that is larger than 1.0, and it is preferable to 1.2, for example.

When the extracting judgment is performed for all the regions by repeating the above steps (FIG. 2, "NO" in Step 3), the title-region extracting is completed. Then respective title-region images 108b extracted as above are registered in a title area Ab of the storage means 108.

Next, character recognizing means 105 cuts the title-region images extracted from the document image off, performs the character recognizing for each title-region image, and then obtains title-character strings that are a character code string. Those title-character strings thus obtained are transferred to display control means 110 via correcting means 112, and are shown to a user by displaying them in a list view on a screen that is not shown (see FIG. 10(I)).

The user confirms each title-region image and title-character string thus displayed, and if he wants to register one of the title-character strings in the same state as shown on the screen, he instructs an instruction inputting means 109 to register it. Then, the title-character string is transferred from the character recognizing means 105 to document registering means 106.

On the other hand, if the user wants to correct or change any of the title-character strings, he double-clicks a title-character string thus displayed by means of a pointing device of the instruction inputting means 109. According to the double-clicking, the correcting means 112 instructs the display control means 110 to blink the title-character string on the screen and display the cursor within the character string. Then the user, operating the keyboard of the instruction inputting means 109, inputs a corrected character string in the correcting means 112, whereby the character string following to the cursor can be replaced with the corrected character string. By inputting the corrected character string to the character recognizing means 105 from the correcting means 112, the title-character string is corrected. Likewise, when the user instructs to perform the registration by the instruction inputting means 109, the corrected title-character string is transferred from the character recognizing means 105 to the document registering means 106.

However, in case where the confirmation and the correcting are not programmed, the contents recognized by the character recognizing means 105 is to be transferred to the document registering means 106 as it is, without displaying it on the screen.

Figure 5:
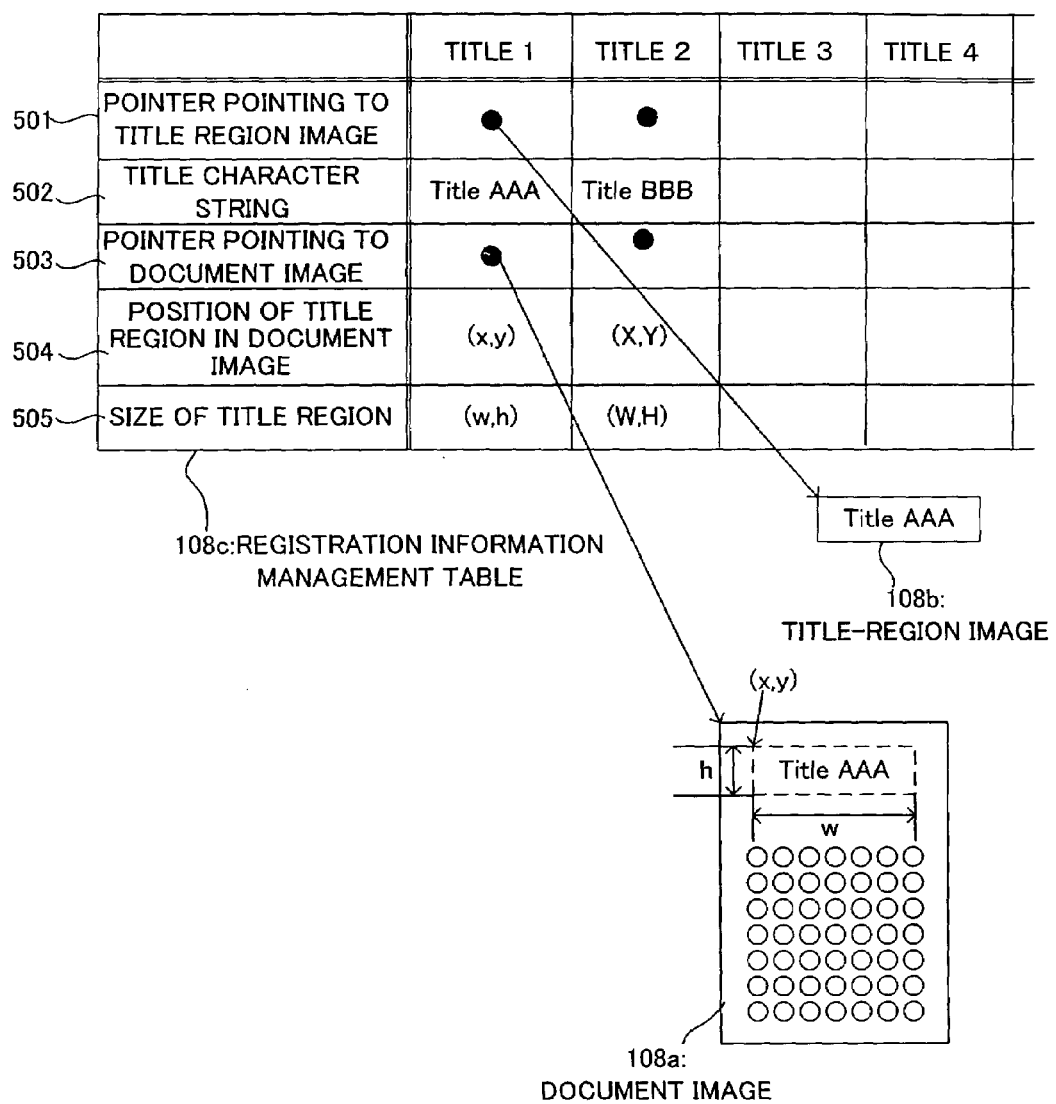
FIG. 5 shows an explanatory diagram of the registration information management table in the first embodiment.

After receiving the title-character string, the document registering means 106 registers the registration information composed of the storage pointer of the document image 108a and the title-region image 108b in the storage means 108, the title-character string, and the position and size of the title region in the document image into a registration information management table 108c formed in the table area Ac on the storage means 108 (see FIG. 5). Here, the storage pointer of the document image 108a can be obtained from the document image area Aa on the storage means 108, the storage pointer of the title image 8b can be obtained from the title area Ab on the storage means 108, and the position and the size of the title region can be obtained from the character recognizing means 105.

After the registration information management table 108c is prepared as above, in case where the instruction of the searching of the document image is inputted by the instruction inputting means 109 such as a keyboard and a pointing device, the display control means 110 displays in a list view the title-region images and the title-character string stored as above on the screen (FIG. 10(I)).

Figure 10:
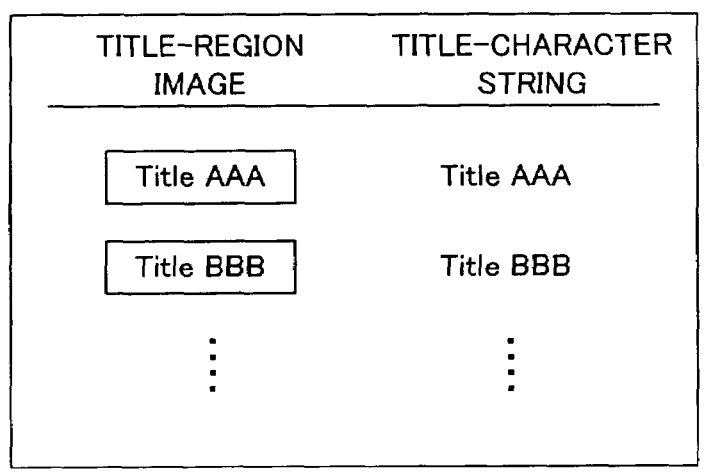
FIG. 10 shows a diagram representing the contents displayed on a screen at the searching in the first embodiment.
Figure 10:
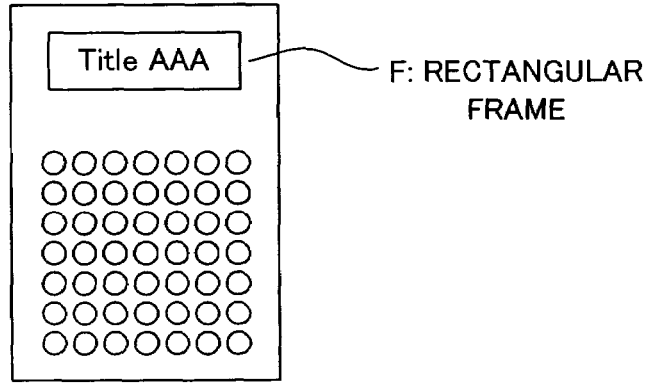

When the user selects a desired title (a title-region image or a tile-character string) from the listed titles on the screen by means of the instruction inputting means 109, the display control means 110 displays on the screen the document image corresponding to the selected title. At this time, as shown in FIG. 10(II), it is preferable that the title region in the document image is indicated clearly by circumscribing it with a rectangular frame F. The rectangular frame F can be prepared according to the position and the size of the title region registered in the registration information management table 108c.

In addition to the above method of selecting either one title from the list displayed on the screen, it can use a method that, when the user inputs specific document tag information from the instruction inputting means 109, if the title corresponding to the specific document tag information has been registered in the registration information management table 108c, the corresponding document image may be displayed on the screen.

In accordance with this embodiment described as above, since it is arranged that regions with the first average larger than the extracting criterion be extracted as a title region, it is possible to extract plural title regions from a document image. Therefore, even if there are many document images having similar contents, it is possible to quickly specify the document tag information (the title) corresponding to the desired document image.

The above explanation does not refer to the steps for a case where there is no region in which the extracting judgment equation is established at the title-region extracting. However, in this case, a message that no title region can be extracted is displayed on the screen and the input of a character string to be the document tag information is requested to the user. The user inputs the character string in response to the request, and then the inputted character string can be used as the title-character string for the document image.

Embodiment 2

It is arranged in the embodiment 1 that, if the regions have the first average larger than the extracting criterion, those regions be extracted as a title region without discrimination. By this method, it is impossible to display the titles by discriminating between the character sizes, that is to say, the processing is such as, where a title character string in a little small character size is handled as a subtitle, the subtitle character string is not listed up but only the title character string is displayed.

In the embodiment of the invention, the above-mentioned problem is settled by calculating plural extracting criteria by using plural levels of extracting parameters, and then extracting the title regions by correlating the title regions with the level attributes (information indicating the level of the extracting). The configuration will be explained hereafter regarding to the points different from that of the embodiment 1.

The title-region extracting means 104, which calculates the first average $SizeReg_n$ and the second average $SizeAll$ according to the same steps as in the embodiment 1, performs the extracting judgment of plural levels according to the result whether the following equation for the extracting judgment on the plural levels is established or not.

$$SizeReg_n >= SizeALL \times \alpha_p \qquad \text{[Equation 4]}$$

$\alpha_p$ in the above equation is a extracting parameter on the p-th level (the level p), and the value of $\alpha_p$ should be predetermined so as to satisfy the condition of the equation 5. When the extracting judgment is performed on 5 levels, it is preferable that each parameter should be determined as approximate $\alpha1=1.5$, $\alpha2=1.3$, $\alpha3=1.2$, $\alpha4=1.15$, and $\alpha5=1.1$.

$$1.0 < \alpha_p < \ldots < \alpha3 < \alpha2 < \alpha1 \qquad \text{[Equation 5]}$$

Figure 3:
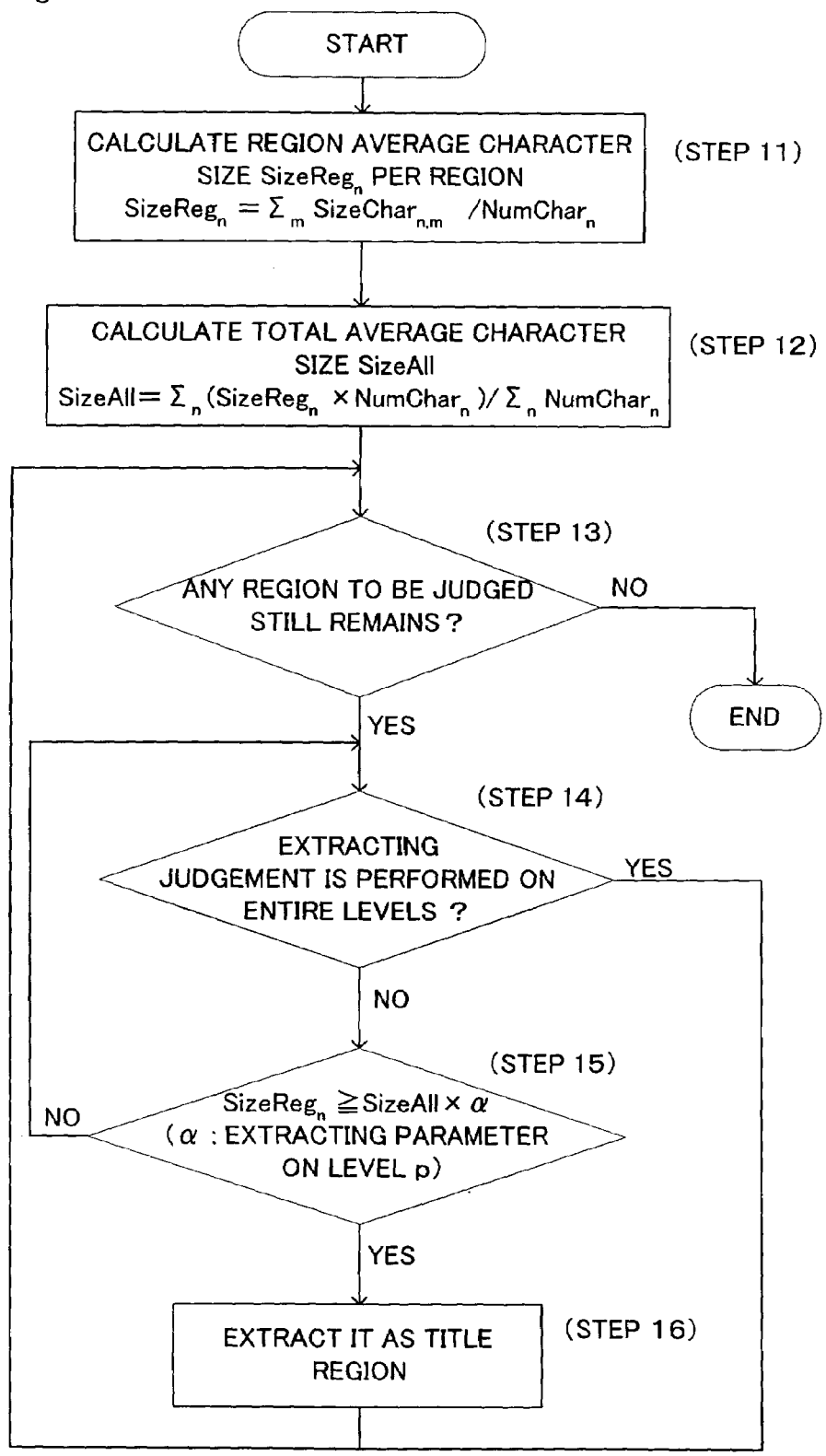
FIG. 3 shows a flowchart of the title-region extracting process in the second embodiment of the invention.

The flowchart shown in FIG. 3 is explained here. The title-region extracting means 104 performs the extracting judgment on every level in the order from the level 1 (FIG. 3, Steps 14 to 15 to 14). When the extracting judgment equation is not established on any level, the region is not extracted as the title region but the title-region extracting means 104 performs the extracting judgment for the next region (FIG. 3, Steps 14 to 13 to 14 to 15). On the other hand, when the extracting judgment equation is established on either one level, the region is extracted as the title region on that level (which is correlated with the level attribute) and then the extracting judgment is performed for the next region (FIG. 3, Steps 15 to 16 to 13 to 14 to 15).

After the extracting judgment is performed for every region by repeating the above steps (FIG. 3, "NO" at Step 13), the title region extracting is completed.

Besides, when there is no region where the extracting judgment equation is established, the character string inputted by a user is used as the title-character string, which is the same as the embodiment 1. The level attribute of this title-character string is set as the level 1 and the number of total levels is set as 1.

In addition, the extracted title-character string can be changed or corrected, which is the same as the embodiment 1.

Figure 6:
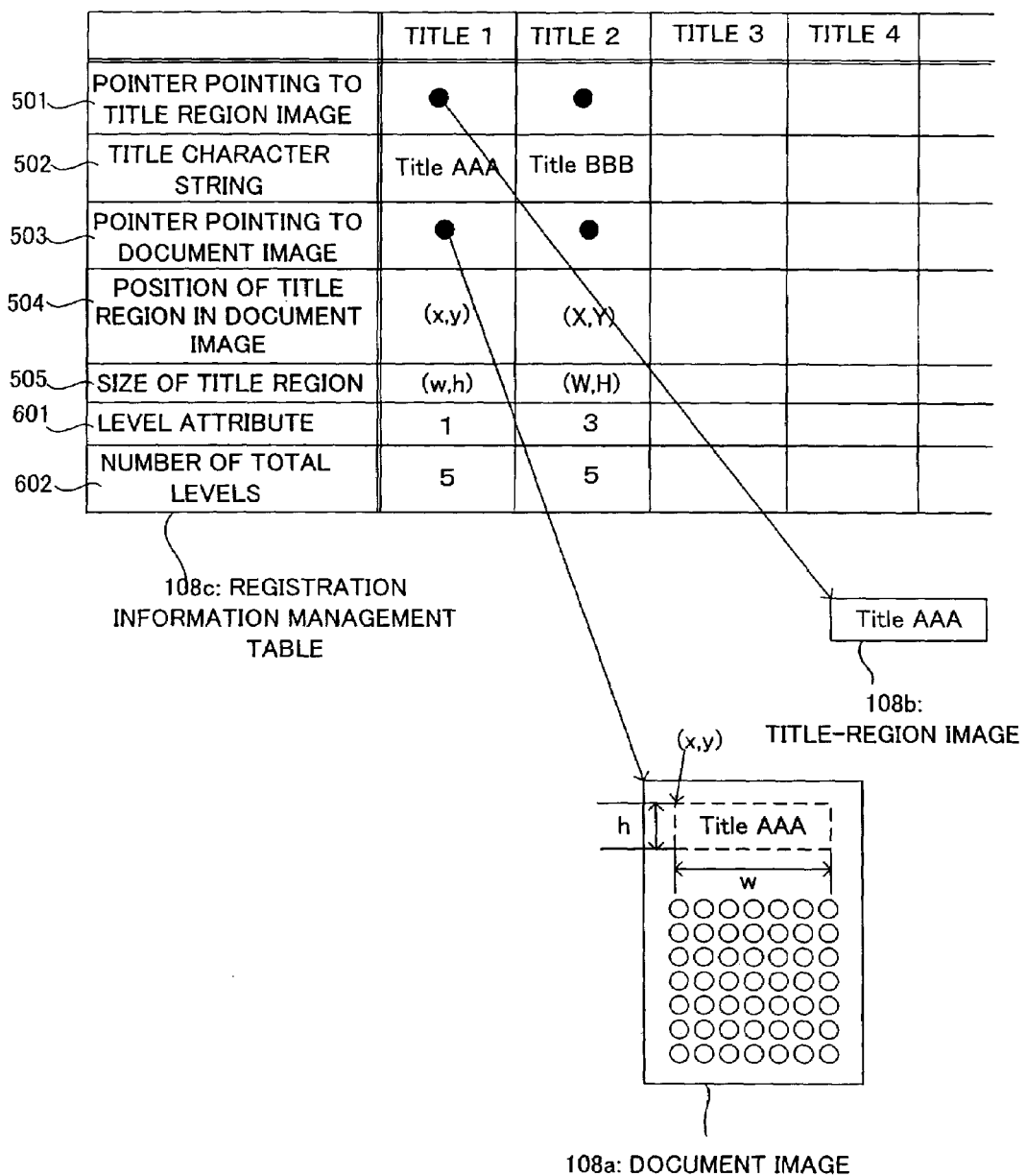
FIG. 6 shows an explanatory diagram of the registration information management table in the second embodiment.

FIG. 6 is an explanatory diagram of the registration information management table 1 in this embodiment. It is arranged that the "level attribute" field 601 and the "number of levels" field 602 be added to the configuration described in the embodiment 1. And when there is any region extracted on the level 1 of the 5 levels of the extracting judgments, the document registering means 106 registers "5" on the "number of levels" field 602 and "1" on the "level attribute" field 601 respectively.

FIG. 11 is a diagram showing the contents displayed on the screen at the searching in this embodiment. It is arranged that each range of the level attribute of the titles to be displayed in a list view on the upper portion can be selected by the instruction inputting means 109. And the display control means 110 displays on the screen in a list view the titles having the level attribute within the range selected as above, referring to the "level attribute" field 601 and the "number of levels" field 602 in the registration information management table 108*c*.

In accordance with this embodiment described above, it is arranged that the extracting criteria of plural levels be calculated by using the extracting parameters of plural levels and the title regions be extracted corresponding to each level attribute. Therefore it is possible to perform various processing by discriminating between the first averages, for example, for displaying in a list view the title-character strings only, without displaying in a list view the subtitle-character strings.

Embodiment 3

Figure 4:
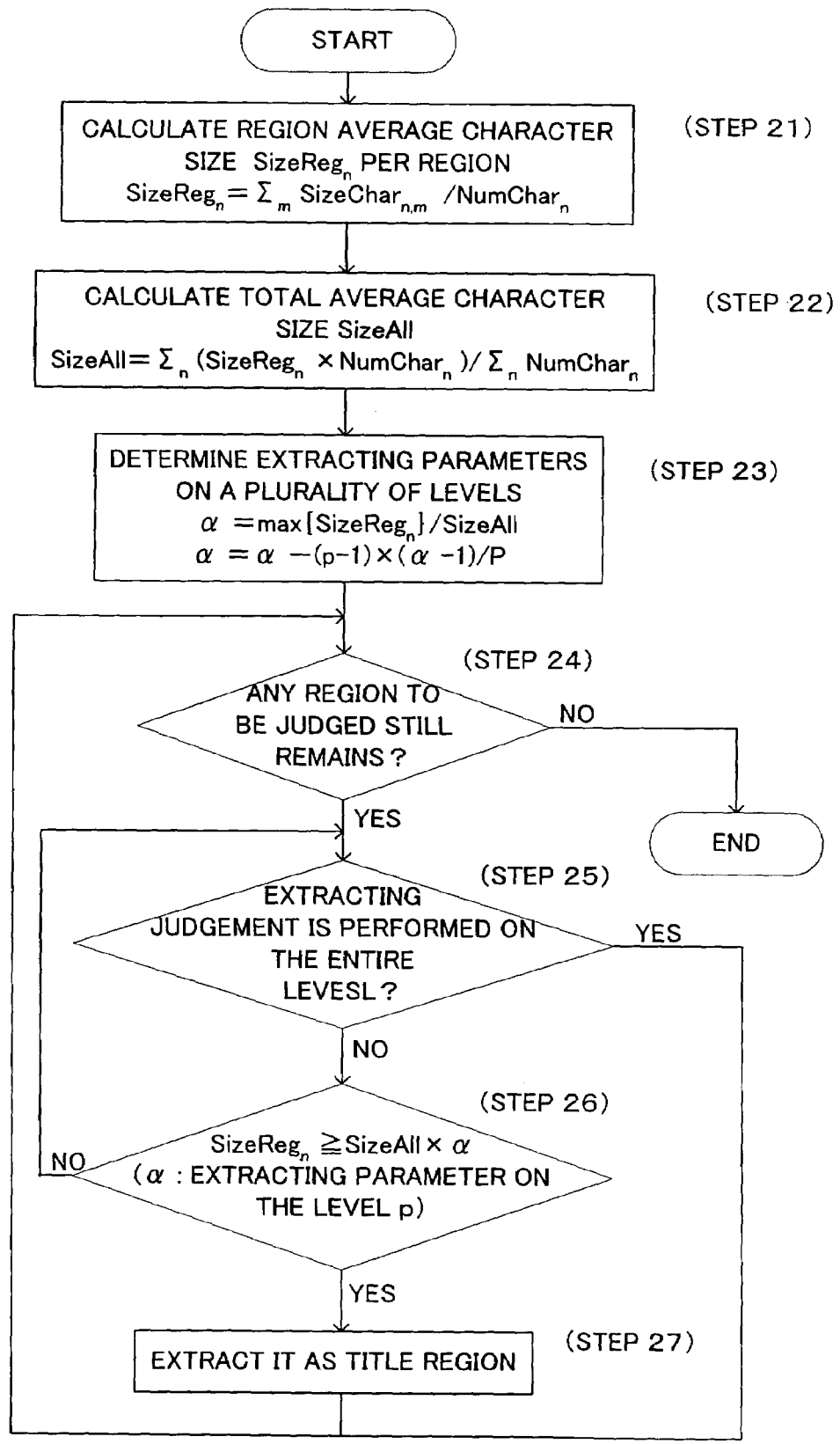
FIG. 4 shows a flowchart of the title-region extracting process in the third embodiment of the invention.

It is arranged in the embodiment 2 that the extracting parameters of plural levels be predetermined (as a fixed value), however, it is preferable that the extracting parameters should be determined according to respective characteristics of the inputted document images. It is arranged in this embodiment that the extracting parameters of plural levels be determined based on a value found by dividing the maximum value of the first averages by the second average (see FIG. 4, Step 23). The configuration will be explained regarding only the point different from that of the embodiment 2.

After calculating the first average $SizeReg_n$ and the second average SizeAll according to the same steps as in the embodiment 2, the title-region extracting means 104 calculates first the value α1 that is the maximum value of the first averages, $\max\{SizeReg_n\}$, divided by the second average SizeAll, according to the following equation.

$$\alpha 1 = \max\{SizeReg_n\}/SizeAll \qquad \text{[Equation 6]}$$

Next, by using the following equation, the title-region extracting means 104 determines the extracting parameters $\alpha_p$ on each level in accordance with thus calculated α1 and the number of total levels P (P>=1) for the extracting judgment.

$$\alpha_p = \alpha 1 - (p-1) \times (\alpha 1 - 1)/P \qquad \text{[Equation 7]}$$

For instance, where the extracting judgment is performed on 5 levels when α1 is 1.5, the extracting parameters α1 to α5 on each level are calculated as follows.

$$\alpha 1 = 1.5 - (1-1) \times (1.5-1)/5 = 1.5$$

$$\alpha 2 = 1.5 - (2-1) \times (1.5-1)/5 = 1.4$$

$$\alpha 3 = 1.5 - (3-1) \times (1.5-1)/5 = 1.3$$

$$\alpha 4 = 1.5 - (4-1) \times (1.5-1)/5 = 1.2$$

$$\alpha 5 = 1.5 - (5-1) \times (1.5-1)/5 = 1.1 \qquad \text{[Equation 8]}$$

According to the equation 7, the extracting parameter $\alpha_p$ on each level can be determined so as to be equidistance between thus calculated α1 and 1.0.

The steps after the above steps is the same as that of the embodiment 2 excluding the extracting judgment by using the extracting parameters determined as described above, and those steps are not explained here.

In the above method, however, where there is no title region in the document image, α1 becomes a value near to 1.0, for example, 1.03, and a text region is extracted as a title region by mistake. In order to avoid such trouble, this invention is arranged so as not to use the extracting parameter under a specific value, for example, 1.5.

In addition, when the difference between extracting parameters on each level is not more than a specific value, 0.03, for example, the extracting judgment cannot be performed precisely. Accordingly, it is arranged that the set value of the extracting parameter be corrected so that the difference between the extract parameters on each level may be said specific value (0.03). Practically, in the above case, values, which are found by subtracting 0.03 from the respective extracting parameters from α1 to α5 in order, are determined as the extracting parameter.

As a result of the above, there is a possibility that the number of total levels P reduces. In this case, the actual number of levels (which is the reduced number of levels subtracted from the number of total levels P) is registered as the number of total levels P on the "number of total levels" field 602 in the registration information management table 108*c*.

In this embodiment as described above, it is arranged that the extracting parameters should not be fixed, but determined based on the characteristics of the inputted document image. Therefore it is possible to perform the extract determination precisely.

Embodiment 4

In each of the above-mentioned embodiments, the characters of the title region in the relatively large size are also taken into the calculation of the second average, and the small characters such as a comma, a period, and punctuation are also taken into that calculation. Thereby the calculation result has an inclination to bring down the accuracy of the title extracting. Therefore it is arranged in this embodiment that the second average be calculated based on the total characters in the document image excluding the characters of which sizes are larger than a specific ratio (90%, for example) and characters of which sizes are smaller than a specific ratio (10%, for example). That is to say, the trimmed mean method is adopted here. In addition, even when the first average is calculated, the same trouble occurs, too. Therefore, it is possible to apply the trimmed mean method to the calculation of the first average.

As a result, it is possible to calculate the second average and the first average regarding the characters excluding a period, a comma and punctuation, so that the calculated averages becomes more precise values.

Here, in each of the aforementioned embodiments, the second average is calculated from the first average. But, when this method is applied to the trimmed mean method, characters in large size and characters in small size are excluded from each title region. For this reason, all the characters included in the title regions should not be excluded for the calculation of the second average. Therefore, it is arranged in this embodiment that the second average be calculated for the total characters in the document image again.

However, even in case of using the trimmed mean method, it is needless to say that either one of the specific value in the embodiment 1 and the level values in the embodiments 2 and 3 can be used as the extracting parameter.

The each explanation of the above embodiments does not refer to the number of the original image documents, but the number of the originals is not limited particularly. That is to say, even if there is only one sheet or plural sheets, it is possible to obtain the same effect as far as the same extracting parameter is used in each page. In particular, it is possible in the embodiments 2 and 3 to extract accurately the title regions and the sub-title regions from one document composed of plural pages, such as a data of the thesis, by using the same extracting parameter to plural pages.

According to the above explanations, the height of the character rectangle is adopted as the character size, but the width or the area of the character rectangle can be adopted as the character size.

As illustrated in FIG. 1, since the image processing means 111a and 111b are provided at the stage before the storage means 108 and the image memory 107 respectively, it is possible to use a binary image as a document image for the title extracting as well as use a compressed image or a multi-valued image as a document image data to be stored in the document image area Aa of the storage means 108. Thereby, it is possible to display in various ways the document images obtained as a result of the searching based on the title regions thus extracted, like displaying in color.

Embodiment 5

Here in the embodiments 5 and 6 is explained about the document image processor that recognizes the marks attached on, the paper document as the document tag information.

First, marks such as a title or a keyword are given to any page composing the paper document by a user. Here the mark indicates a general mark given by a user so as to identify the paper document, like a stamp, a seal, an illustration, a signature of specific handwriting, and so on.

When the document image processor in the invention stores the paper composed of a plurality of pages, it is necessary to judge which page of the paper document the marks are attached to. At this time, though there is a method for detecting the marks after the searching all over the total pages of the paper document, there is a problem in the method that it takes much time for the detecting.

The method to solve said problem is as follows; for instance, the document image processor is configured so as to detect a mark on the first page only, in advance.

In this embodiment of the invention, the marked pages (which is called "document tag information appointing page" hereafter) 21 and 24 can be distinguished from others by describing the specific 2-dimensional code image 26 on the specific position of the lower right, as shown in FIG. 13(b).

Figure 12:
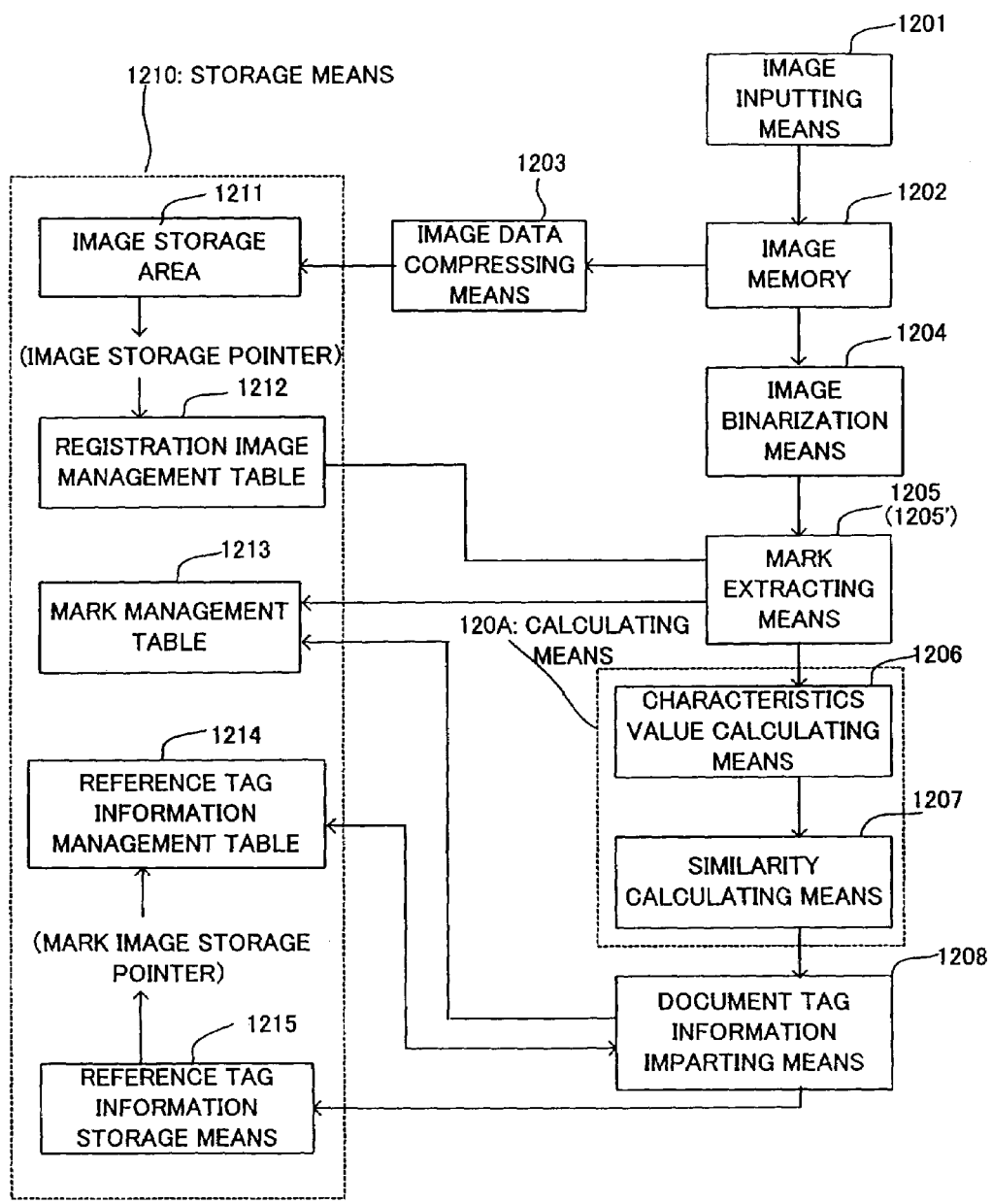
FIG. 12 shows a schematic functional block diagram of a document image processor in the fifth and sixth embodiments of the invention.

FIG. 12 shows a block diagram of the document image processor in the embodiment 5 of the invention. The steps of the processing by the document image processor will be explained hereafter.

Figure 13:
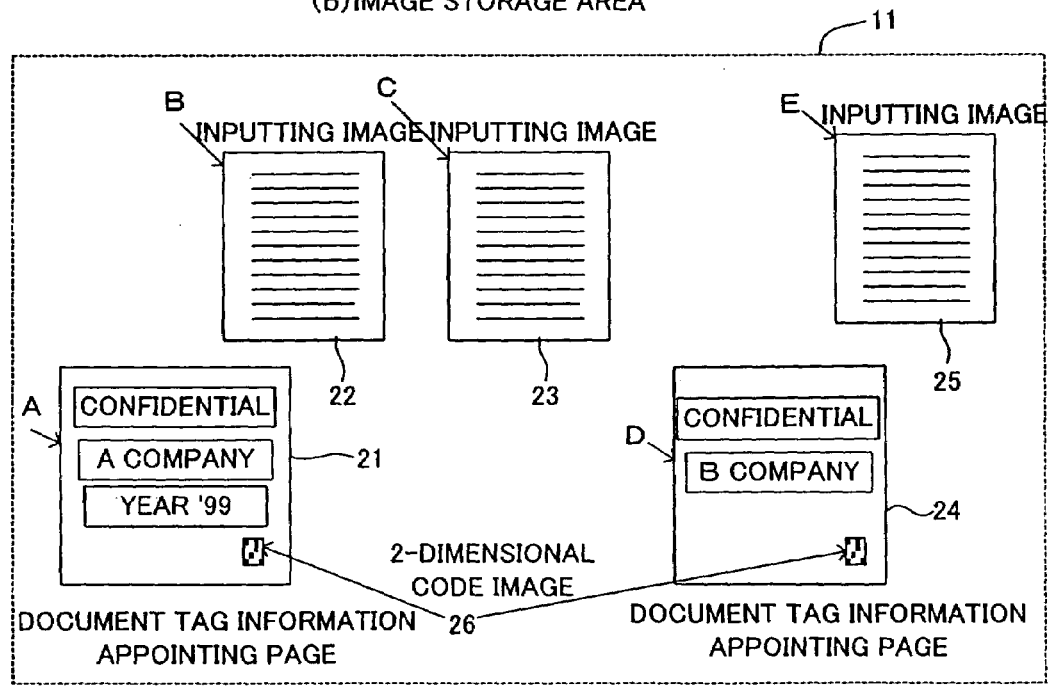
FIG. 13 shows an explanatory diagram of the registration image management table in the fifth and the sixth embodiments of the invention.

First, the image inputting means 1201 converts the paper document to an electronic data by using an photoelectric converter such as a scanner, a digital integrated apparatus, and so on, and then inputs the document as the document images. Here, as shown in FIG. 13, the document tag information attached to the document tag information appointing page 21, "Confidential", "A-company", and "Year '99", should be given to the inputted images 22 and 23, and the document tag information attached to the document tag information appointing page 24, "Confidential" and "B-company", should be given to the inputted image 25. And the image inputting means 1201 is inputted the document tag information appointing page 21, the input image 22, the input image 23, the document tag information appointing page 24 and the input image 25, in those order.

The inputted document image is stored in the image memory 1202 temporarily, for which the image data compressing means 1203 performed the data compressing. After that, said data is stored in the image storage area 1211 of the storage means 1210. At this time, in order to identify each document image thus stored, an image ID is given to the document image respectively. The image ID is registered in the "image ID" field 121 of the registration image management table 1212 shown in FIG. 13(a). In addition, the pointer information pointing to the image data stored in the image storage area 1211 of the storage means 1210 is registered in the "pointer to image data" field 122 of the registration image management table 1212.

On the other hand, the document image stored in the image memory 1202 is also sent to the mark extracting means 1205 after the binarization by the binarization means 1204. The mark extracting means 1205 judges whether the specific two-dimensional code image is at the predetermined position of the lower right of the image or not, and determines whether the inputted document image is the document tag information appointing page or not respectively.

At this time, if the document image is determined as the document tag information appointing page, "1" is registered on the "document tag information appointing page flag" field 123 of the registration image management table 1212, if not, "0" is registered on it. The flag is applied to the identification that the document image is the document tag information appointing page attached with the marks only and does not contains the content as the text of the paper document. For instance, after the document tag information are given to the document image according to the other-mentioned method, the document image corresponding to the document tag information appointing page can be deleted according to the flag. Thereby it is possible to avoid a waste of the memory resources.

A mark management group No. is given to the entire document images inputted between the first document tag information appointing page and the next one. In addition, the mark management group No. is registered on the "mark management group No." field 125 of the registration image management table 1212. Here, it means that the document image to which the same document tag information is given is imparted the same mark management group No.

The next explanation refers to the processing that the mark extracting means 1205 extracts the marks from the document image determined as the document tag information appointing page according to the above processing.

Figure 16:
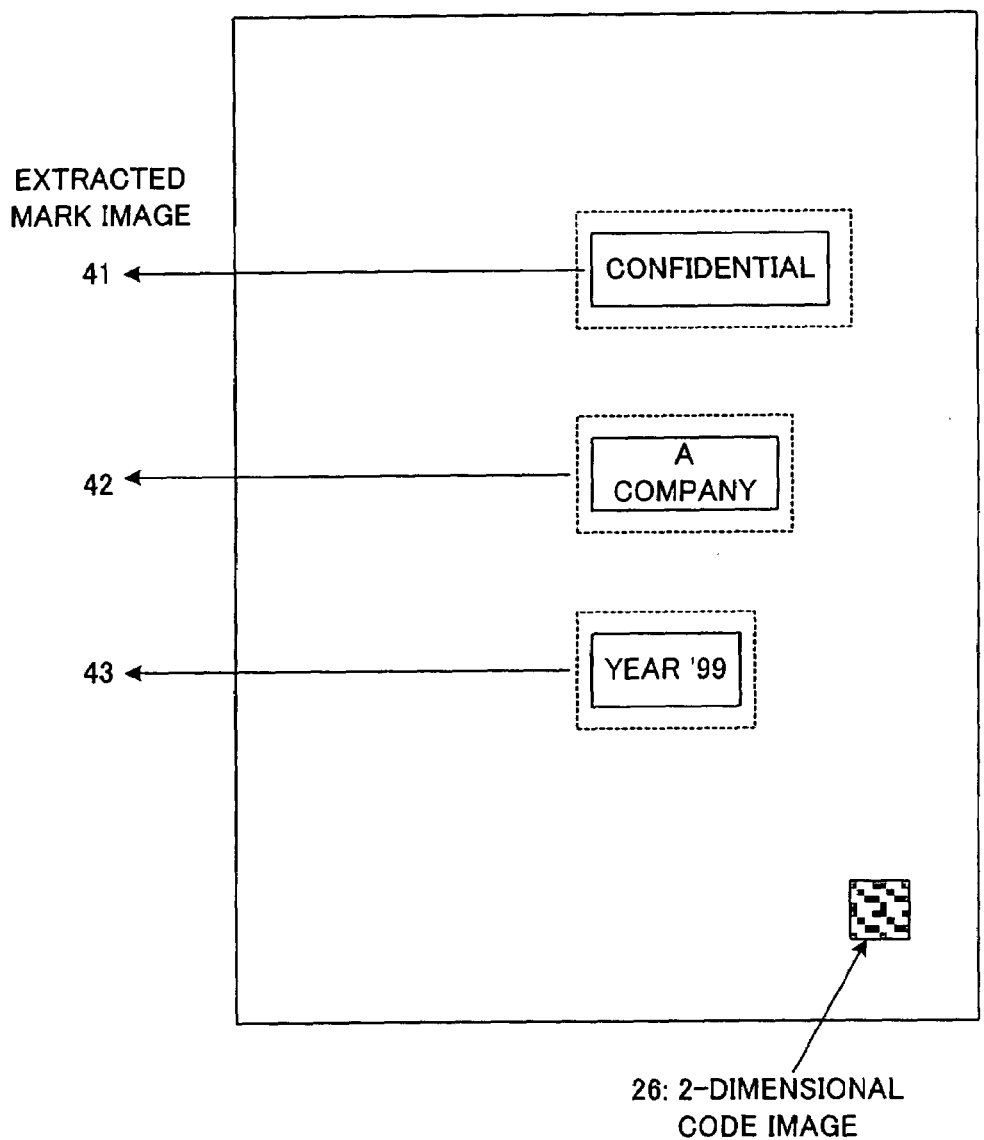
FIG. 16 shows an explanatory diagram for the extracted mark image.

First, as described in the embodiment 1 it labels the entire regions excluding the regions attached with the two-dimensional code among the document tag information appointing pages. Among a plurality of the black pixels contiguous components obtained by the labeling, the components that have the distance from each other smaller than the specific threshold value are combined to one region. The regions thus obtained are corresponding to the regions of marks 41 to 43 respectively, as shown in FIG. 16. Those regions are extracted, and thereby each mark image can be obtained.

The number of marks extracted from each document tag information appointing page is registered on the "number of marks" field 124 of the registration image management table 1212.

In addition, in order to manage the information of the extracted mark images, each mark image is attached with a mark ID, and then registered on the "mark ID" field 131 of the mark management table 1213 as shown in FIG. 14. The mark management group No. of the document tag information appointing page attached with the mark is registered on the "mark management group No." field 132 of the mark management table 1213. Regarding each of the mark images extracted from the document tag information appointing page, the information about the position and the size (the width and the height) of the mark image within the document tag information appointing page are registered on the "position" field 134 and the "size" field 135 of the mark management table 1213 respectively.

In this embodiment, the document images inputted between the first document tag information appointing page and the next one is attached with the same mark management group No., and managed as a series of document images attendant on the first document tag information appointing page. It can be considered as another management method that only the specific document image inputted after the document tag information appointing page is given the mark management group No. and the other document images are not given any number. This method can be applied when a user wants to give the table of contents to the specific document image.

Next, the characteristics value calculating means 1206 of the calculating means 120A calculates the numerical value representing the characteristics of the mark image extracted by the mark extracting means 1205. The invention applies the characteristics value of the Moment Invariants of the well-known prior arts to this numerical value. The following explanation is made regarding the Moment Invariants in brief.

When the coordinates of a pixel is represented by (i, j) and the value of the pixel is represented by I(i, j), I is a function that satisfies I=1 for the black pixel meanwhile satisfies I=0 for the white pixel. The $m_{pq}$ defined by the Equation 9 is called the (p+q)-dimensional moment.

$$m_{pq}=\Sigma_i\Sigma_j i^p j^q I(i,j) \quad p,q=0, 1, 2, \ldots \quad \text{[Equation 9]}$$

In case of applying the above $m_{pq}$, the center of gravity (x, y) of the two-dimensional image is represented by the Equation 10.

$$x=m_{10}/m_{00}$$

$$y=m_{01}/m_{00} \quad \text{[Equation 10]}$$

$\mu_{pq}$ defined by the Equation 11 according to the center of gravity thus calculated is called the center moment.

$$\mu_{pq}=\Sigma_i\Sigma_j(i-x)^p(j-y)^q I(i,j) \quad \text{[Equation 11]}$$

The numerical values M1 to M6 calculated as follows by the Equation 12 according to the above center moment are defined as the characteristics value of the corresponding two-dimensional image (or on the Moment Invariants).

$$M1=\mu_{20}+\mu_{02}$$

$$M2=(\mu_{20}-\mu_{02})^2+4\mu_{11}^2$$

$$M3=(\mu_{30}-3\mu_{12})^2+(3\mu_{21}-\mu_{03})^2$$

$$M4=(\mu_{30}+\mu_{12})^2+(\mu_{21}+\mu_{03})^2$$

$$M5=(\mu_{30}-3\mu_{12})(\mu_{30}+\mu_{12})[(\mu_{30}+\mu_{12})^2-3(\mu_{21}+\mu_{03})^2]+ \\ (3\mu_{21}-\mu_{03})(\mu_{21}+\mu_{03})[3(\mu_{30}+\mu_{12})^2-(\mu_{21}+\mu_{03})^2]$$

$$M6=(\mu_{20}-\mu_{02})[(\mu_{30}+\mu_{12})^2-(\mu_{21}+\mu_{03})^2]+4\mu_{11}(\mu_{30}+\mu_{12}) \\ (\mu_{21}+\mu_{03}) \quad \text{[Equation 12]}$$

Since those characteristics values are unchangeable even in case of the rotation or the translation of the two-dimensional image, those become the effective value for characterizing the mark like the embodiment of the invention when a user gives a specific mark to a sheet by hand.

The characteristics value calculated by the characteristics value calculating means 1206 is given to the similarity calculating means 1207 of the calculating means 120A, where the similarity between these characteristics value and the attribute value of respective reference tag information is calculated. In order to explain this method, the following is the explanation about the management method of the reference tag information and the calculating method of attribute value of the respective reference tag information.

The reference tag information is the data correlated with the mark that a user will use in the future (which is called the "reference mark" hereafter), specifically, and the nominee of the document tag information like the character string playing a role as a keyword for the inputted image. The reference tag information is registered on the "reference tag information" field 141 of the reference tag information management table 1214 as shown in FIG. 15(a). The image data of the reference mark is stored in the reference tag information storage means 1215. The pointer to this image data is registered on the "pointer to reference mark image" field 142 of the reference tag information management table 1214. The characteristics value calculating means 1206 calculates six characteristics values of those reference marks on the Moment Invariants, which are registered on the "attribute value (M1 to M6)" field of the reference tag information management table 1214. That is to say, those characteristics values are the attribute values of the respective reference marks.

The distance between the attribute value of the reference mark thus calculated and the respective characteristics value on the Moment Invariants of the mark image extracted from the inputted image is calculated by the Equation 13.

$$L = (m1-M1)^2 + (m2-M2)^2 + (m3-M3)^2 + (m4-M4)^2 + (m5-M5)^2 + (m6-M6)^2 \quad \text{[Equation 13]}$$

The above M1 to M6 represent the attribute value of the reference mark, while the above m1 to m6 represent the characteristics value of the extracted mark image. It expresses that the smaller the distance L calculated by the above equation, the higher the similarity of the extracted marked image and the reference tag information is.

The document tag information imparting means 1208 specifies a reference mark of which similarity is the maximum value, and selects the reference tag information of the reference mark as the document tag information of the inputted document image, and then imparts the information to the document image. In addition, the document tag information is registered on the "document tag information" field 133 of the mark management table 1213.

By applying the above-mentioned processing, it is possible to automatically impart the document tag information to the inputted document image respectively. By using the information of each table obtained here, the searching of the image can be performed according to the following procedure.

First, when a user selects one of document tag information to be used for the searching, the mark management group Nos. corresponding to the document tag information can be specified from the mark management table 1213. Additionally, the image IDs of the document image attached with the mark management group No. and the pointer information to the document image data can be specified from the registration image management table 1212. The document image specified here becomes the image correlated with the document tag information designated by the user. By designating a plurality of document tag information, it is possible to narrow down the image data to be searched.

When the document tag information with the maximum of the similarity calculated by the similarity calculating means 1207 has the distance L from the extracted mark image that is larger than the predetermined threshold value, it is judged that there is no registered document tag information to be correlated with this mark image but new reference mark is inputted. In this case, the mark image is displayed according to the information of the "position" field 134 and the "size" field 135 of the mark management table 1213 and the "pointer to image data" field 122 of the registration image management table 1212, and then the user is asked to register the document tag information to be correlated with the new reference mark.

The document tag information inputted here is newly registered on the "reference tag information" field 141 of the reference tag information management table 1214. The image data of the reference mark inputted newly is stored in the reference tag information storage means 1215 in order to apply it to the succeeding researching, meanwhile the pointer information to the mark image data is registered on the "pointer to reference mark image" field 142 of the reference tag information management table 1214. In addition, the characteristics value of the new reference mark on the Moment Invariants is calculated and then registered on the "attribute values (M1 to M6)" field 143 of the reference tag information management table 1214.

As described above, a user executes the input of the new mark image and the document tag information; thereby the new reference tag information can be registered.

Figure 15:
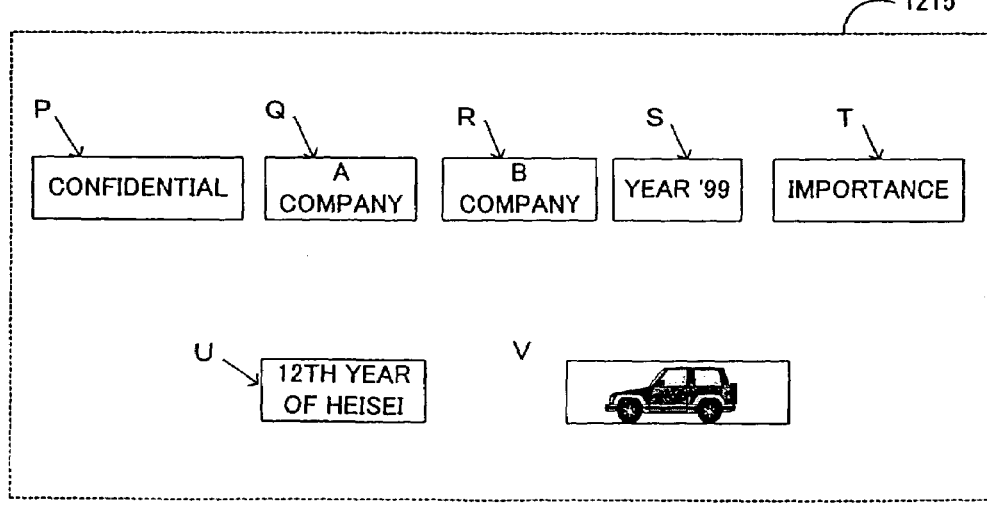
FIG. 15 shows an explanatory diagram of the reference tag information management table.

Beside, in the above explanation, the reference tag information correlated with the reference mark is the character string applied to the reference mark as shown in FIG. 14 and FIG. 15(*a*), but the reference tag information needs not always to be the character string. That is to say, each reference mark can be correlated with any reference tag information in the reference tag management table 1214.

For example, instead of the reference tag information of the above-mentioned character string, the thumbnail image of reference mark is correlated with the reference mark as the reference tag information respectively. The thumbnail image is printed on a researching sheet. By reading the thumbnail image of the researching sheet by a scanner, the desired document image can be searched.

In order to specify the document tag information appointing page among the entire inputted images, the two-dimensional code is applied as shown in the explanatory diagrams in FIG. 13 and FIG. 16. However the one-dimensional code and so on can be used, too. There are other methods for specifying the document tag information appointing page than the above, that is, a method that a specific mark is used instead of the two-dimensional code image, a method that a specific colored sheet is used, or a method that a specific formed sheet or a specific sized sheet is used. It is possible to obtain the same effect by those methods.

In addition, when the same document tag information is imparted to the entire inputted images, it is possible to arrange the document image processor by defining that only the image to be inputted as the first sheet is the image of the document tag information appointing page. In this case, since it has already been known that the image inputted as the first sheet is the document tag information appointing page, it needs not the processing for specifying the document tag appointing page by the two-dimensional code image and so on. Therefore, it is possible to simplify the processing as the whole.

It is needless to say that it is possible to extract the mark by searching the entire pages of the paper document without using the two-dimensional code. At this time, it will happens that characters included in the paper document, such as the "Confidential", and etc. are extracted as a mark in addition to the mark attached by a user. In this case, the characters may be added to the mark management table 1213 as one of the mark.

The correlating between the mark image and the reference tag information is performed by using the characteristics value on the Moment Invariants in the above explanation, however it is possible to obtain the same effect by the correlating of the templates matching that compares the rate of the black pixels matched by overlapping two images.

Besides, it is possible to correlate a plurality of the reference marks with a piece of reference tag information. This is carried out by the following method; a plurality of the same reference tag information is registered on the reference tag information management table 1214, and then is correlated with the different reference mark respectively. In this case, after the paper document attached with different marks is inputted, the document images thus inputted is attached with the same document tag information.

Conversely, one reference mark can be correlated with a plurality of reference tag information. This is carried out by the method that the different reference tag information in the reference tag information management table 1214 is correlated with the same reference mark. In this case, after the paper document attached with one mark, the document image thus inputted is attached with a plurality of the document tag information.

Embodiment 6

This embodiment describes the method for imparting the document tag information to the document image by extracting the mark stamped at the blank part of the paper document to be registered. The followings express the points different from that of the embodiment 5 with reference to FIG. 12.

Figure 17:
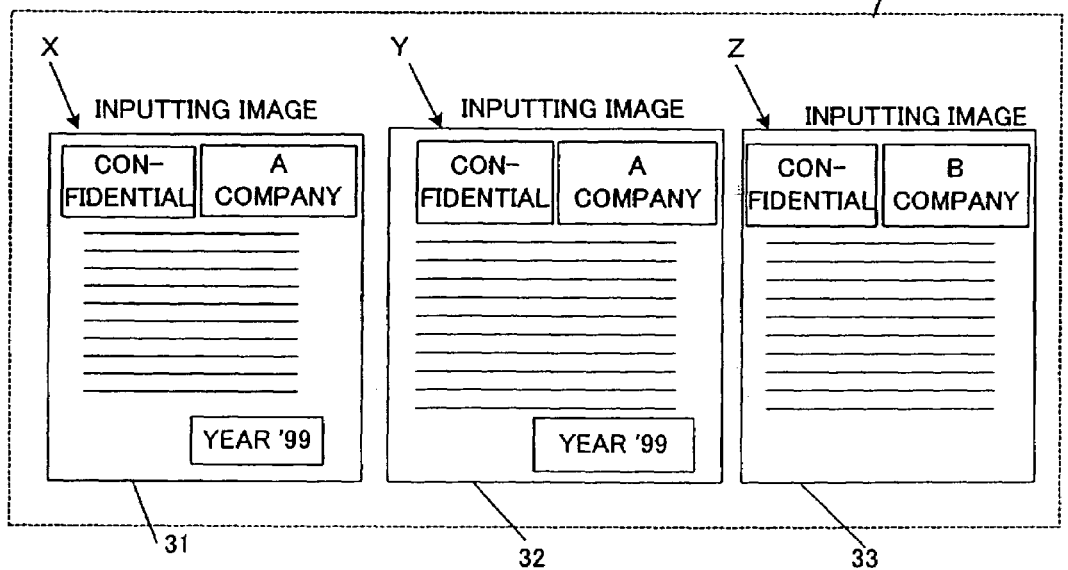
FIG. 17 shows an explanatory diagram the registration image management table in the sixth embodiment of the invention.
Figure 19:
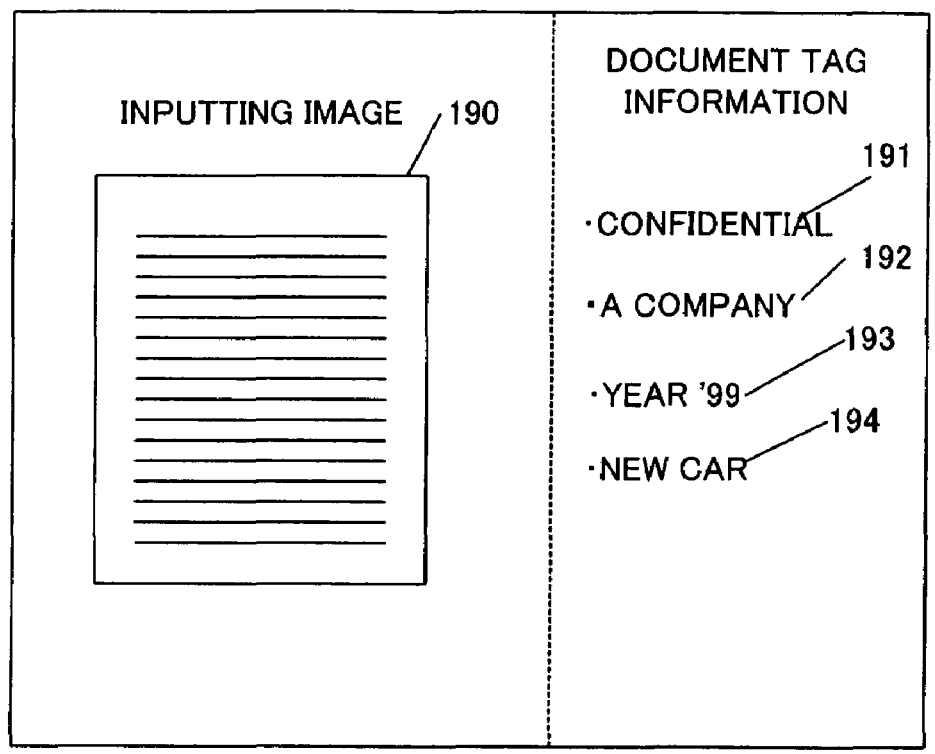
FIG. 19 shows an explanatory diagram expressing the conception of the document tag information.

The image inputting means 1201 obtains document images by electronically converting a paper document inputted by a user, like the embodiment 5. As shown in FIG. 17(*b*), the document tag information of "Confidential", "A-company", and "year 99" is attached to the document images 31 and 32, while the document tag information of "Confidential" and "B-company" is attached to the document image 33. In order to perform processing, the blank part of each image is stamped with a mark correlated with the document tag information to be attached with.

The image data obtained here is stored in the image memory 1202 temporarily. And after the data is compressed by the image data compressing means 1203, it is stored in the image storage area 1211 of the storage means 1210. As the information about the stored image data, the necessary information is registered respectively in the "image ID" field 121' and the "pointer to image data" field 122' of the registration image management table 1212' as shown in FIG. 17(*a*), which is the same as in the embodiment 5.

The image of the image memory 1202 is sent to the mark extracting means 1205' after the binarization by the image binarization means 1204. In order to extract the region of the mark image precisely, this embodiment uses a mark with frame as shown in FIG. 17(*b*) and performs the extracting of each mark by the mark extracting means 1205' as follows.

Each black pixel of the binary image is labeled, and the size of the circumscribing rectangle is calculated per black-pixel-connected component. At this time, the size of the circumscribing rectangle of the black-pixel-connected component corresponding to the frame portion of the mark is large sufficiently comparing the each character size included in the inputted image, but does not get large extremely because the mark is stamped within the blank part of the document. By applying the characteristics, out of the black-pixel-connected components obtained by the labeling, only the region of which the circumscribing rectangle has the size between the specified two threshold values is extracted. That is to say, by extracting the region of the black-pixel-connected component wherein the respective sizes of the height and the width are larger than the specific threshold value (that is considered as the minimum size of the blank (the height and the width)), and less than another threshold value (that is considered as the maximum size of the blank), it is possible to extract the region of each mark image.

The number of marks extracted from the document images by the above processing is registered respectively on the "number of marks" field 124' of the registration image management table 1212'. Each extracted mark image is imparted with a mark ID respectively. The mark ID is registered in the "mark ID" field 131' of the mark management table 1213'. In addition, the information about the image ID of the inputted image attached with the mark, the information about the position that the mark was attached, and the information about the mark size are registered on the "image ID" field 132', the "position" field 134', and the "size" field 135' of the mark management table 1213', respectively.

The embodiment of the invention is arranged so as to impart the document tag information to the image attached with the mark only. Beside, when an image is inputted between the image with the first mark and the other image with the next mark, if a user wants to manage it as a series of the document images included in the image with the first mark, they can be managed by imparting the mark management group No. to those images like the embodiment 5.

Like the embodiment 5, the calculating means 120A (the characteristics value calculating means 1206 and the similarity calculating means 1207) and the document tag information imparting means 1208 specify the document tag information correlated with the mark image according to the characteristics value of the Moment Invariants of the well-known technology. And the specified document tag information is registered on the "document tag information" field 133' of the mark management table 1213'.

If the above-mentioned processing is adopted, by the simple inputting that a mark is stamped on the blank of the paper document to be registered, it is possible to imparting the document tag information by the automatic searching. In this case, it is not necessary for the document tag information appointing page used in the embodiment 5, and the only document to be registered is inputted. As described above, the registration image management table 1212' and the mark management table 1213' are configured simply more than that of the registration image management table 1212 and the mark management table 1213 in the embodiment 5.

It is needless to say that this embodiment can adopt the method for imparting the two-dimensional code to the page attached with a mark in order to speed up the mark extracting.

In the invention of this embodiment, the mark stamped on the blank part of the side describing the content of the paper document is inputted. However, when a scanner and etc. can permit to scan both sides of the sheet, the input can be performed by stamping the mark on the backside. It can be also expected the same effect.

In addition, the mark has a frame, but the frame is not always necessary. In case of the mark without the frame, since it is considered generally that the mark be configured by the black pixels contiguous components of which size is larger than the characters included in the text of the paper document, it is possible to apply the embodiment.

As mentioned above, first of all, since the invention is configured that the region of which the first average of the character size is larger than the extracting criterion is extracted as the title region, it is possible to extract a plurality of title regions from one document image. In addition, it is possible to perform the extracting judgment on a plurality of levels according to the extracting parameters on a plurality of levels. Thereby the title region can be determined according to the characteristics of the document images inputted with the extracting parameters on a plurality of levels. Since the trimmed mean method for calculating excluding both characters included in the specific proportion of the larger side and those included in the specific proportion of the smaller side is applied to the calculation of the second average of the character size and the calculation of the first average of the character size, it is possible to improve the precision of the extracting.

Moreover, secondarily, the invention can impart the document tag information to the inputted image automatically by inputting the marked document to the document image processor without using the keyboard or the pointing device. By using the document tag information attached by the processing, the document image can be searched. Therefore, it is possible to manage and utilize the document image processor effectively.

What is claimed is:

1. A document image processor comprising:
   image inputting means for preparing a document image by reading a paper document;
   region dividing means for dividing the document image into a plurality of regions; and
   title-region extracting means for calculating first averages as an average of character size for characters in each region divided by the region dividing means, and then extracting title regions from the respective regions according to the first averages,
   wherein the title-region extracting means further comprises:
   means for calculating a second average that is an average of character size for characters within all the regions;
   means for comparing the first averages and extracting criteria found by multiplying the second average by extracting parameters, the extracting parameters on a plurality of levels calculated based on a value found by dividing a maximum of the first averages by the second average; and
   means for extracting the regions with the first average larger than the extracting criteria, as the title region.

2. A document image processor according to claim 1, wherein the title-region extracting means calculates the first averages and the second average based on an average height of characters.

3. A document image processor according to claim 1, wherein the title-region extracting means calculates the first averages and the second average based on an average width of characters.

4. A document image processor according to claim 1, wherein the title-region extracting means calculates the first averages and the second average based on an average area of characters.

5. A document image processor according to claim 1, wherein the means for extracting the regions as the title region further extracts each level attribute indicating the level corresponding to each extracted title region.

6. A document image processor according to claim 1, wherein the title-region extracting means adopts the trimmed mean method for discarding a specific proportion of the minimum and the maximum values and then computing the means of the remaining values, in order to calculate the first averages and the second average of character size.

7. A document image processor according to claim 6, wherein the characters of which character size are lower than the specific portion are punctuation marks.

8. A document image processor according to claim 1, further comprising correcting means for correcting character strings of the extracted title regions.

9. A document title extracting method for a document image processor comprising:
   an image inputting step of preparing a document image by reading a paper document;
   a dividing step of dividing a plurality of regions from the document image;
   a calculating step of calculating first averages as an average of character size for characters in each region; and
   a title-region extracting step of extracting title regions from the respective regions according to the first averages, and
   wherein the calculating step comprises a step for calculating a second average that is an average of character size in all the regions,
   the title-region extracting step comprises a step of comparing the first averages and extracting criteria found by multiplying the second average by extracting parameters, the extracting parameters on a plurality of levels calculated based on a value found by dividing a maximum of the first averages by the second average; and
   a step of extracting the regions with the first average more than the extracting criteria, as the title region.

10. A document title extracting method for a document image processor according to claim 9, in which the calculating step comprises a step of calculating the first averages and the second average based on an average height of characters.

11. A document title extracting method for a document image processor according to claim 9, in which the calculating step comprises a step of calculating the first averages and the second average based on an average width of characters.

12. A document title extracting method for a document image processor according to claim 9, in which the calculating step comprises a step of calculating the first averages and the second average based on an average area of characters.

13. A document title extracting method for a document image processor according to claim 9, in which the step of extracting the regions as the title region further extracts each level attribute indicating the level corresponding to each extracted title region.

14. A document title extracting method of a document image processor according to claim 9, further comprising the step of:
    correcting character strings of the extracted title regions.

15. A computer readable medium storing a program for performing the steps of:
    dividing a document image prepared by reading a paper document into a plurality of regions;
    calculating first averages as an average of character size for characters within each region and a second average that is an average of character size in all the regions;
    comparing the first averages and extracting criteria found by multiplying the second average by extracting parameters, the extracting parameters on a plurality of levels calculated based on a value found by dividing a maximum of the first averages by the second average; and
    extracting the regions with the first average more than the extracting criteria, as the title region.

16. A document title extracting method for a document image processor comprising:
    an image inputting step of preparing a document image by reading a paper;
    a dividing step of dividing a plurality of regions from the document image;
    a calculating step of calculating first averages as an average of character size for characters within each region; and
    a title-region extracting step of extracting title regions from the respective regions according to the first averages, and
    wherein the calculating step comprises a step for calculating a second average that is an average of character size in all the regions,
    the title-region extracting step comprises a step of comparing the first averages and extracting criteria found by multiplying the second average by extracting parameters, the extracting parameters on a plurality of levels calculated based on a value found by dividing a maximum of the first averages by the second average; and a step of extracting the regions with the first average larger than the extracting criteria, as the title region, and the first averages and the second average are calculated according to the trimmed mean method for discarding a specific proportion of the minimum and the maximum values and then computing the means of the remaining values.

17. A document title extracting method for a document image processor according to claim 16, in which the calculating step comprises a step of calculating the first averages and the second average based on an average height of characters.

18. A document title extracting method for a document image processor according to claim 16, in which the calculating step comprises a step of calculating the first averages and the second average based on an average width of characters.

19. A document title extracting method for a document image processor according to claim 16, in which the calculating step comprises a step of calculating the first averages and the second average based on an average area of characters.

20. A document title extracting method of a document image processor according to claim 16, further comprising the step of:

correcting character strings of the extracted title regions.

21. A document title extracting method of a document image processor according to claim 16, wherein the characters of which character size are lower than the specific portion are punctuation marks.

* * * * *